Jan. 2, 1968     M. LADNEY, JR     3,361,245
TAPE CONVEYOR FOR SPRAY PAINTING
Filed Jan. 13, 1966
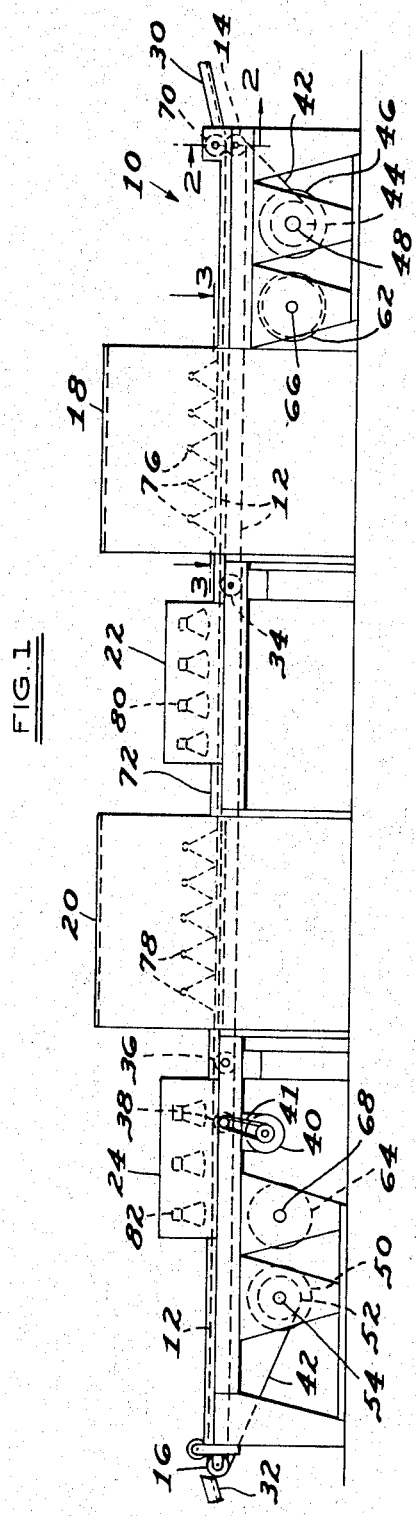
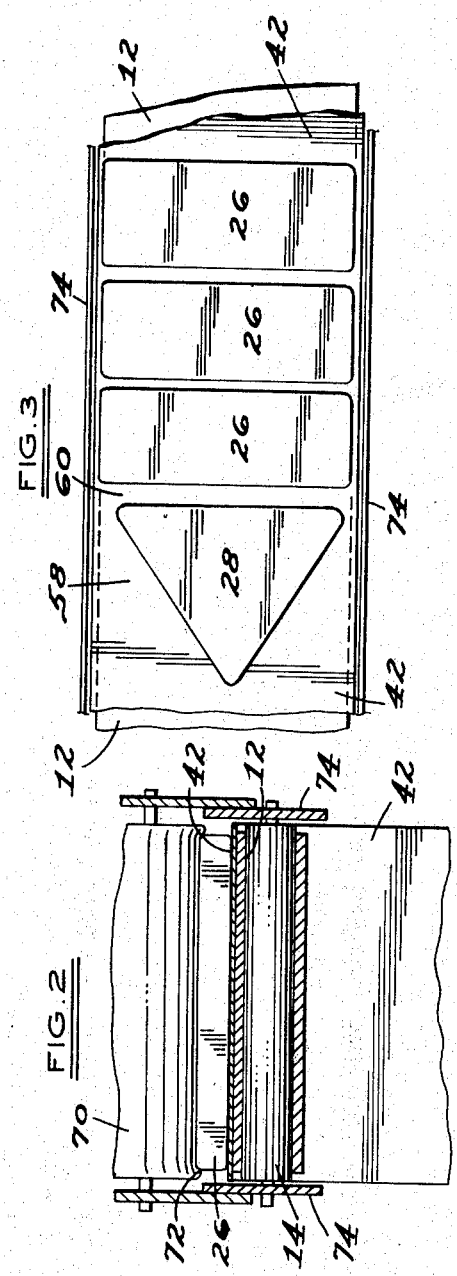
INVENTOR
MICHAEL LADNEY, JR.
BY
*Barnes, Kisselle, Raisch & Choate*
ATTORNEYS

United States Patent Office 3,361,245
Patented Jan. 2, 1968

3,361,245
TAPE CONVEYOR FOR SPRAY PAINTING
Michael Ladney, Jr., Grosse Pointe Shores, Mich.
(18125 E. 10 Mile Road, East Detroit, Mich. 48220)
Filed Jan. 13, 1966, Ser. No. 520,520
3 Claims. (Cl. 198—1)

This invention relates to article handling and in particular to an apparatus and method for conveying articles which are coated as by spray painting.

In many operations where articles are spray painted by supporting them on a conveyor which travels through a spray booth or area, one of the problems that arises is the necessity of periodically stopping the operation to clean the conveyor of the paint accumulating thereon. The cleaning operation is not only costly from the standpoint of the time required to clean the conveyor but also from the standpoint of the time that production is interrupted.

The primary object of the invention is to provide a method and apparatus for spray painting which eliminates the necessity for cleaning the conveyor at frequent, regular intervals.

More specifically it is an object of this invention to provide a spray painting method and apparatus wherein an endless conveyor element for supporting the articles to be painted is protected from the application of paint thereto by applying a masking material thereto. The masking material is preferably in the form of a strip of masking tape which is adhesively coated on both faces so that it will adhere to the endless conveyor element and is also adapted to have the articles to be painted adhesively secured thereto.

In the drawings:

FIG. 1 is an elevational view, somewhat schematic, of a conveyor for spray painting booths according to one embodiment of the invention.

FIG. 2 is a greatly enlarged sectional view taken along line 2—2 of FIG. 1.

FIG. 3 is an enlarged fragmentary top view of the conveyor and articles transported by it.

To carry out the invention, a conveyor belt is masked with a disposable web, preferably masking tape, which travels through a spray painting or coating zone with the conveyor belt and protects it from coating material that is applied in the coating zone to articles transported by the conveyor. The web may be replaced when too much coating material collects on it but the conveyor belt itself does not require cleaning. Consequently, the conveyor can be used for extended periods of time without cleaning in contrast with unmasked conveyors which, in spray painting applications, have to be cleaned at very frequent intervals. The web can be replaced quickly, so down time is reduced, thereby increasing productivity. The time between masking web replacements is extended by utilizing a long web, supplied as a roll. A semi-continuous masked conveying is accomplished by compelling the web to unwind from the supply roll, travel through the coating zone in masking relation with the belt and wind onto a take-up roll after leaving the coating zone. The articles are carried on the web and the web acts to shield the belt from the coating material. The web may be discarded after it is replaced with a new web. For masked conveying of very small and light articles, it is desirable for the web to have pressure-sensitive adhesive on the side which contacts the articles, the adhesive serving to retain the articles in place so that they do not become displaced enroute along the conveyor.

Referring to the drawings, conveyor mechanism 10 includes an endless conveyor belt 12 represented by a broken line in FIG. 1. Belt 12 passes around rollers 14 and 16 at opposite ends of the conveyor mechanism and passes through two separate spray painting booths 18 and 20 arranged in tandem and two drying ovens 22 and 24, one following each painting booth. Articles 26 and 28 to be painted are fed down a chute 30 to belt 12 near roller 14 and are transported by the belt through booth 18, oven 22, booth 20 and oven 24, in that order, to another chute 32 where they are discharged from the conveyor mechanism. Belt 12 passes over intermediate rollers, such as rollers 34, 36 and 38. One of the rollers (roller 38 in FIG. 1) engages belt 12 so as to drive it, and this roller is rotated by a motor 40 and belt 41. The other rollers may be idlers.

Belt 12 is masked during its travel from roller 14 to roller 16 by masking tape 42 supplied from a tape roll 44 on a reel 46 mounted for rotation on a shaft 48. In operation, tape 42 unwinds from supply roll 44 and travels with and over belt 12 through booth 18, oven 22, booth 20 and oven 24 to a take-up reel 50 where it winds into another tape roll 52. Take-up reel 50 is mounted for rotation on a shaft 54 and is rotated counter-clockwise, as viewed in FIG. 1. Reel 50 is driven by suitable means, not illustrated, such that the peripheral speed of the tape wound thereon is the same as conveyor belt 12. Tape 42 may be slightly wider than belt 12 (FIG. 2) in order to completely shield the belt from paint which is sprayed onto the articles 26, 28 in booths 18 and 20.

Paint collects on tape 42 in the areas such as 58 and 60 (FIG. 3) which are not covered by articles 26, 28, but little or no paint reaches belt 12. If the articles being coated substantially cover tape 42, roll 52 can be reused. In some cases articles such as 28 are coated which cannot conveniently be arranged so as to cover tape 42 and consequently reel 50 is discarded after the whole tape is wound on it. Another supply reel 44 loaded with fresh tape may then be placed on shaft 48 and fed to a new take-up reel 50 placed on shaft 54.

Alternatively, a standby supply reel 62 and a standby take-up reel 64 may be utilized, reels 62 and 64 being mounted for rotation on shafts 66 and 68, respectively. When the tape from the original supply reel 46 has been unwound and rewound on take-up reel 40, the tape from reel 62 is placed over belt 12 and wound onto standby take-up reel 64. This may be accomplished by simply sticking the end of the tape to belt 12 where it passes over roll 14, rotating the conveyor until the tape-end passes over roll 16, and then sticking the tape-end to take-up reel 64. The conveyor may then be operated, using tape from reel 62 while reels 46 and 50 are replaced.

Tape 42 has pressure-sensitive adhesive material on at least one side, and may have adhesive material on both sides if desired. In the latter case, the tape adheres to belt 12, and articles 26 and 28 adhere to tape 42. A resilient, yieldable pressure wheel 70 presses articles 26, 28 onto tape 42 and forces tape 42 against belt 12 so that the pressure-sensitive adhesive material on opposite sides of tape 42 sticks respectively to belt 12 and articles 26, 28 (FIG. 2).

Wheel 70 may be made of sponge rubber. Its outer peripheral surface 72 is located just above roll 14 and is spaced from the top surface of roll 14 a distance less than the combined thickness of article 26, tape 42, and belt 12. An article slides down chute 30 onto tape 42 just ahead of rolls 14 and 70. As the article moves between the latter rolls, the outer surface 72 of roll 70 yields, and due to the resilience of wheel 70 forces the article against tape 42 making it stick to the tape. The adhesive on the other side of the tape 42 causes it to adhere to belt 12 due to the tension forces which draw it toward the belt. However, these forces are supplemented by the action of pressure wheel 70. The pressure-sensitive adhesive material may be omitted from one or both sides of tape 42; that is, it may not be essential to have adhesive material on either side of the tape in some applications.

Tape 42 and belt 12 are guided by upright rails 74 which extend lengthwise of conveyor 10 along the edges of the tape. Paint-spraying nozzles 76 and 78 are supported in booths 18 and 20 above belt 12. Drying lamps 80 and 82 are supported in ovens 22 and 24 above belt 12. Lamps 80 and 82 may be of the infra-red type. When the painted or coated articles reach chute 32, they automatically detach themselves from the tape and slide down chute 32 primarily because of the peeling action which occurs as they travel around the periphery of roller 16.

I claim:

1. In the method of spray painting or coating articles which are caused to travel through a spray zone while supported on an endless driven conveyor belt the steps comprising directing a strip of adhesively coated masking tape into overlying supported relation with the belt so as to completely shield the top exposed side of the belt in advance of the spray zone, adhesively securing the masking tape to the top run of the belt so that the masking tape is driven by the belt, adhesively securing the articles to be sprayed on the upper side of the belt supported tape at a location upstream from said spray zone, causing said articles to travel on and with said tape through the spray zone, spraying the articles as they travel through the spray zone and removing the articles from the tape and separating the tape from the belt on the downstream side of the spray zone.

2. The method called for in claim 1 wherein the tape is applied to the belt by unwinding it from a supply roll and is separated from the belt by rewinding it on a take-up reel.

3. In a spray painting or coating apparatus of the type which includes a spray booth and a conveyor mechanism for transporting the articles to be sprayed through the spray booth, that improvement which comprises a power driven endless conveyor belt forming part of the conveyor mechanism and extending from one end of the spray booth, through the booth and out through the other end thereof, said belt being adapted to support articles to be sprayed, means spaced upstream from the inlet end of the spray booth supporting a supply roll of masking tape, means spaced downstream from the outlet end of the spray booth and supporting a take-up reel for said masking tape, said tape having a width such as to generally cover said belt and being adhesively coated on the under side thereof, means for directing the tape from said supply roll into overlying relation to said belt and for causing said tape to adhere to and thereby travel with said belt through said spray booth and means for winding said tape onto said take-up reel after it travels through said spray booth, means for feeding articles to be coated onto said belt and tape upstream of said spray booth where the tape overlies the belt, a pressure roll of resilient, yieldable material and means for supporting said pressure roll for rotation with the periphery thereof in pressure engagement with said belt at the feed point for the articles to be coated, said pressure engagement serving to press the tape against said belt and to press the articles onto said tape, said tape having adhesive material on the top side thereof for adhering the articles thereto.

References Cited
UNITED STATES PATENTS

| | | | |
|---|---|---|---|
| 1,626,041 | 4/1927 | Kyle | 198—203 |
| 2,503,771 | 4/1950 | Roll | 107—56 |
| 2,914,422 | 11/1959 | Pratt | 117—105.3 |

RICHARD E. AEGERTER, *Primary Examiner.*

EVON C. BLUNK, *Examiner.*